(No Model.)  3 Sheets—Sheet 1.
F. L. McGAHAN.
ELECTRIC MOTOR.
No. 455,109.  Patented June 30, 1891.
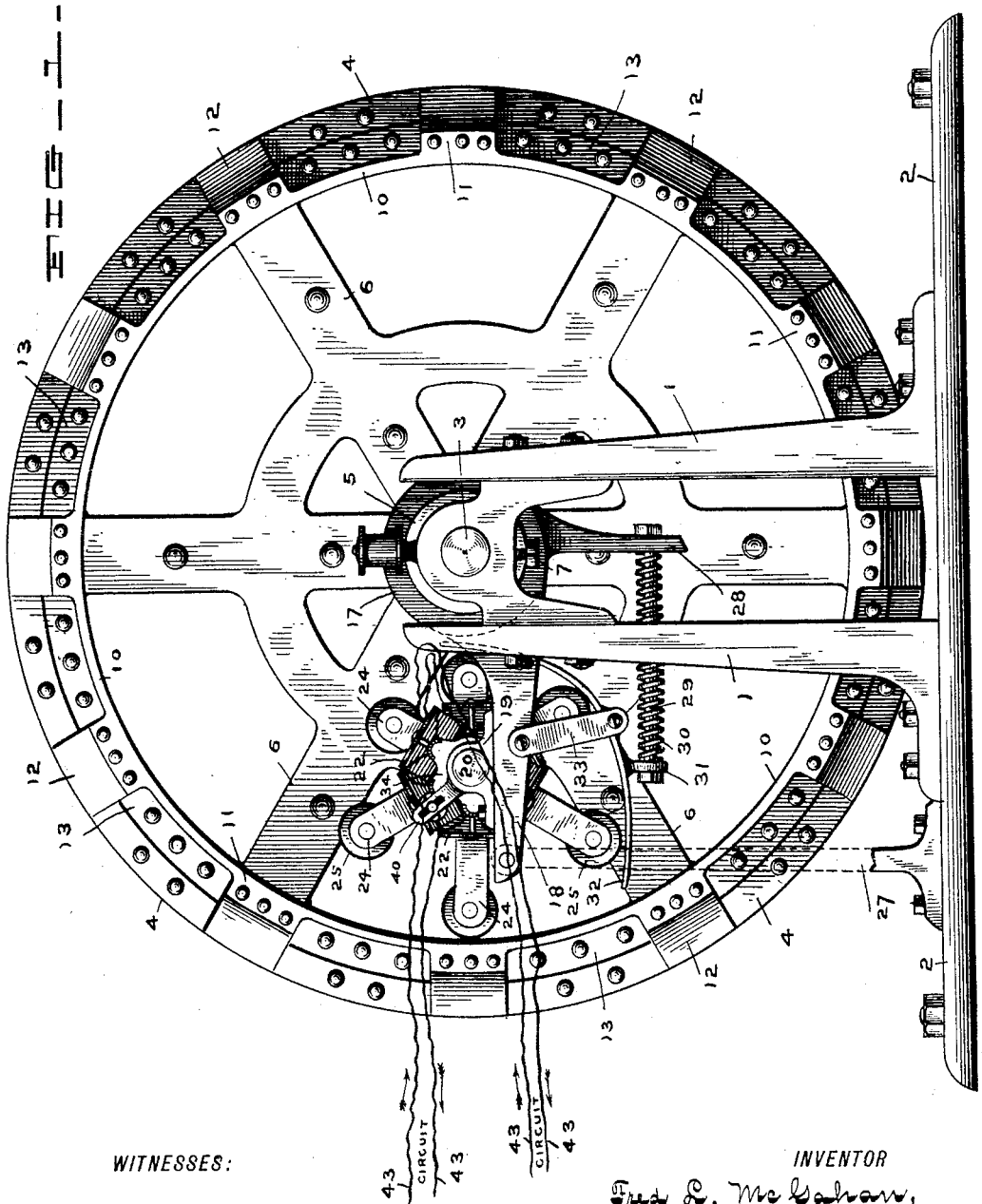
WITNESSES:  INVENTOR
H. D. Nealy  Fred L. McGahan,
C. B. Griffith.  BY
 C. P. Jacobs.
  ATTORNEY.

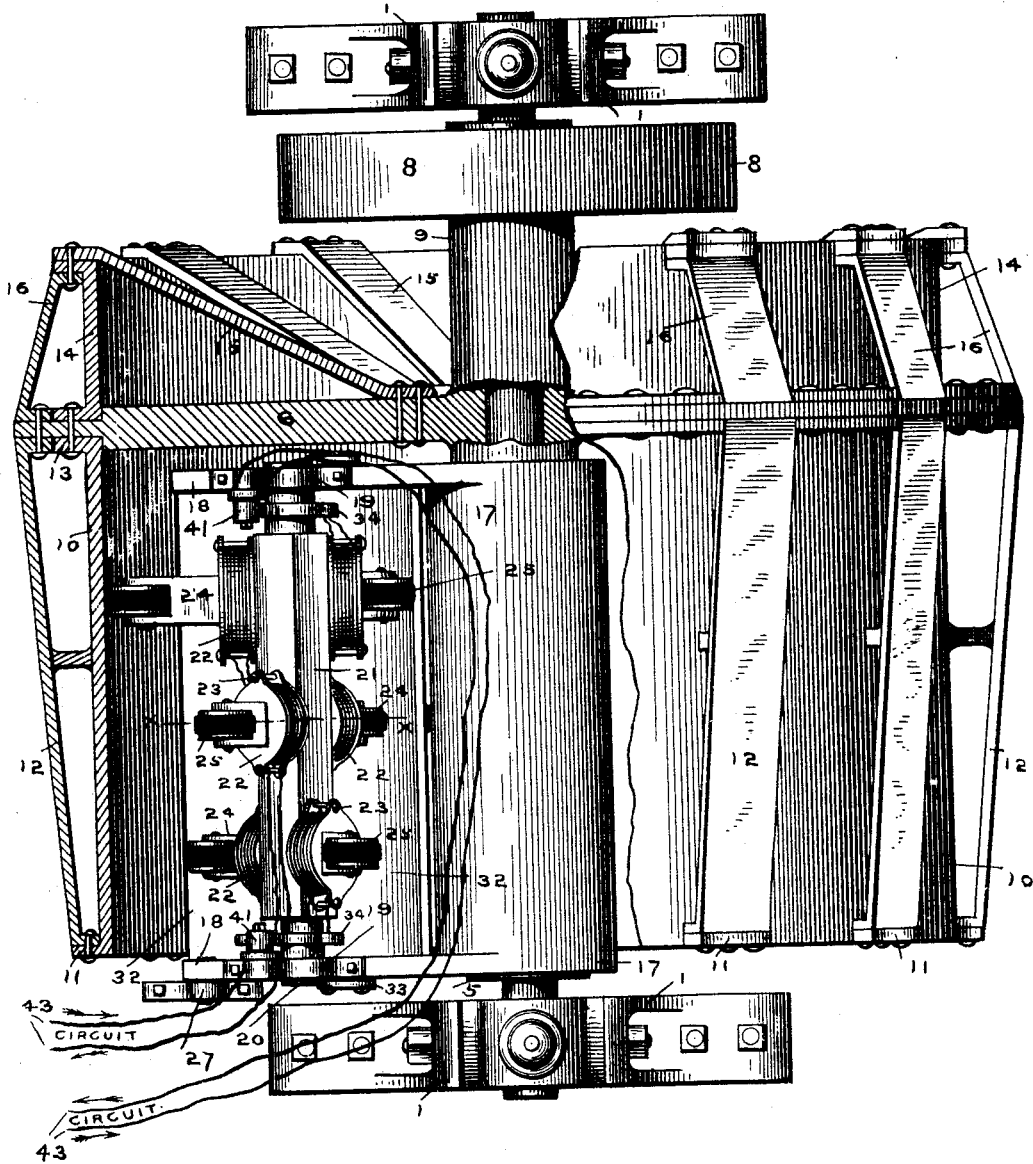

(No Model.) 3 Sheets—Sheet 3.
F. L. McGAHAN.
ELECTRIC MOTOR.
No. 455,109. Patented June 30, 1891.
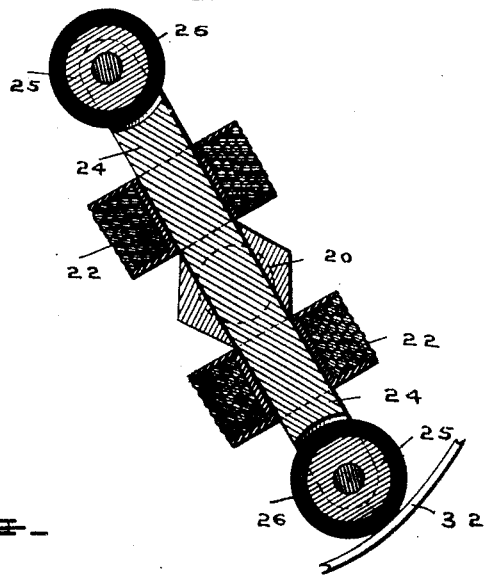
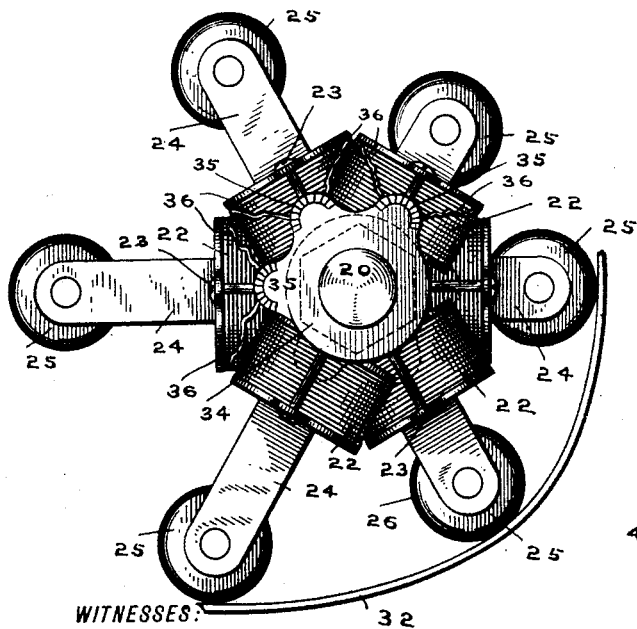
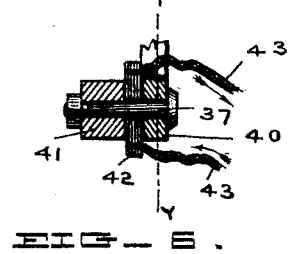
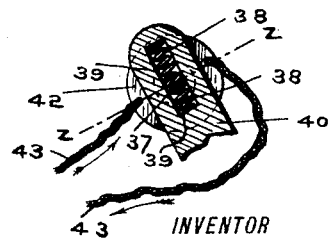
WITNESSES: INVENTOR
Fred L. McGahan,
BY
C. P. Jacobs.
ATTORNEY.

UNITED STATES PATENT OFFICE.

FREDERICK L. McGAHAN, OF INDIANAPOLIS, INDIANA.

ELECTRIC MOTOR.

SPECIFICATION forming part of Letters Patent No. 455,109, dated June 30, 1891.

Application filed February 11, 1891. Serial No. 381,058. (No model.)

*To all whom it may concern:*

Be it known that I, FREDERICK L. MCGAHAN, of Indianapolis, county of Marion, and State of Indiana, have invented certain new and useful Improvements in Electric Motors; and I do hereby declare that the following is a full, clear, and exact description thereof, reference being had to the accompanying drawings, in which like letters refer to like parts.
My invention relates to the construction of electric motors, and will be understood from the following description.

In the drawings, Figure 1 is a side elevation. Fig. 2 is a top plan view partly broken away. Fig. 3 is a longitudinal section through one of the motor-dogs and its coils on the line *x x*, Fig. 2. Fig. 4 is a detached end view of the motor proper and a part of the pressure-plate. Fig. 5 is a section through the brush and its bracket on the line *z z*, Fig. 6. Fig. 6 is a section on the line *y y*, Fig. 5. Figs. 3 to 6 are on an enlarged scale.

In detail, 1 is a frame-work resting upon a base 2, providing bearings for the stationary axle 3 of the main wheel 4, 5 being the hub, and 6 the spokes, which are formed integral with each other, the entire wheel revolving upon the axle 3, which is rigidly held in its bearings by set-screws 7.
8 is a driving-pulley mounted on an extension 9 of the hub. The wheel 4 is formed of a circular drum 10, having lugs 11 on the outer edge, to which are connected braces 12, and on the opposite side of the drum is formed a flange 13. This comprises the body of the wheel proper, and in order to secure a greater weight and a steady motion to the shaft an extension 14 is connected on the opposite side, which is stayed by braces 15, bolted to the spokes 6, the outer ends of these spokes extending beyond the face of the wheel to provide for the attachment of shorter braces 16, which with the braces 12 are bolted together through the end of the spokes. The flange 13 of the drum and the flange of the extension 15 are also secured to the spokes in a similar manner, as shown in Fig. 2.

Mounted loosely on the hub 5 is a sleeve 17, having horizontal arms 18, which provide bearings in adjustable boxings 19 for the axle 20. This axle is round at the ends, but its central portion 21 is hexagonal, the faces of the sides forming seats for the coils 22, which are fastened by screws 23 to the axle.

24 are dogs provided with friction-wheels 25 at each end, with rubber faces 26, such dogs passing loosely through the coils and through openings in the axle 20. The arms 18 are sustained in a horizontal position by a rod 27, bolted to the base of the machine, as shown in dotted lines in Fig. 1.

Depending from the sleeve 17 is an arm 28, through which extends a rod 29, on which is coiled a spring 30, this rod passing through an ear 31, connected to a curved pressure-plate 32, and the friction-wheels on the inner ends of the dog are adapted to bear against the inner face of this plate in the manner hereinafter described.

33 are links pivotally connecting the pressure-plate with the arms 18, thus providing an additional point of support for the plate. The length of the dogs 24 is such that when one of the dogs is in a horizontal position, its inner wheel bearing against the pressure-plate, the wheel upon the outer end will bear against the inner face of the driving-wheel 4. This inner face forms a frictional surface for the revolving of the wheel through the operation of the motor-dogs 24.

On the cylindrical ends of the axle 20 are mounted collars 34. These collars have curved projections which form seats for commutators 35, formed of alternate strips of lead and copper. The commutators are connected by wires 36 with the coils 22 of the dogs, each of these commutators being connected with both ends of the wires of a single coil. It will be understood that one of these collars, bearing the commutators, is located near each end of the axle 20, there being but three of the commutators on either collar, and these are so arranged that each one of the commutators is in line with one of the dogs at one end or the other, as shown in Fig. 4, wherein the three commutators at one end are shown in full lines and the three at the other end in dotted lines.

37 is a spindle working between coiled springs 38 in a slot 39, formed in a projection 40 from the upper side of the boxing 19, as shown in Fig. 1.

41 is a revolving brush loosely mounted on this spindle and in frictional contact with a stationary collar 42, formed of layers of copper, also mounted on the spindle 37, and to this collar are connected the circuit-wires 43, through which the current to and from the motor passes. One of the brushes 41 is attached to each of the brackets 40, as shown in Fig. 2.

The operation of my machine is as follows: The current passing in over one of the circuit-wires 43 through the collar 42 and by contact through the brush 41 enters that one of the commutators with which the brush is in contact, and thence, passing through the wires of the coil connected thereto, operates to draw upward the dog passing through such coil, which is practically the core of that electro-magnet, and the parts are so arranged that the dog which is thus affected is always in an overhanging position, having been brought into such position by the pressure-plate below, so that as the main wheel 4 revolves, the friction-wheel of that dog will be in position to operate directly against its inner face, the brush remaining in contact with the commutator connected with the coil of that dog, the current from the circuit-wire through the coil holding the dog in a raised position until it has passed over so far that it cannot fall back and must go forward, and as the wheel revolves the next commutator is brought into contact with the brush, allowing the current to pass through the upper coil of the next dog, raising such dog in the same manner, and so on successively. The power thus exerted by the current in forcing the dogs outward brings the wheel on the end of the dog thus forced forward directly in frictional contact with the inner face of the main wheel 4 and operates to revolve this wheel, and as each dog passes onward and drops out of operation the next one succeeds it in the same manner, its outer wheel bearing frictionally against the inner face of the main wheel, and the dogs successively are again forced forward as the commutator comes in contact with the brush, and the wheel is kept in motion, and any required speed, and consequently power, may, within reasonable limits, be obtained. The main wheel revolving, of course the driving-pulley revolves with it, and by connecting this pulley by a belt with a similar pulley any suitable machine may be driven.

What I claim as my invention, and desire to secure by Letters Patent, is the following:

1. In an electric motor, a power-wheel mounted on an axle having bearings in a suitable support, one or more electro-magnets connected in the main circuit and adapted to revolve on an axle suitably supported from the frame, the cores of such magnets provided with friction-wheels having insulated surfaces and passing through the shaft upon which the coils are supported, an elastic pressure-plate pivoted below to the frame-work, adapted to contact with the friction-wheels of the cores successively during the revolution of the shaft, collars rigidly mounted on such shaft, having commutators connected therewith in line with the cores of the magnets, and a brush connected with the shaft-boxings at each end for contacting with the commutators successively as they revolve with the shaft, such commutators connected with the wires of the coils, and the brushes connected to the main circuit-wires, the force of the current and the pressure-plate combining to thrust forward the cores to contact with and drive by friction the main wheel, substantially as shown and described.

2. In an electric motor, a main wheel loosely mounted on an axle having bearings in the frame-work, its inner face providing a friction-surface, a series of dogs passing through coils, a revolving shaft supported within the main wheel, these dogs provided with insulated surfaces, commutators carried on collars revolving with such shaft, brushes connected with the wires of the main circuit, and the commutators connected with the wires of the coils, whereby the force of the current combined with that of the pressure-plate operates to thrust the dogs outward to contact with the inner face of the main wheel for revolving the same, substantially as shown and described.

3. In an electric motor, a power-wheel loosely mounted on a shaft having bearings in a frame-work, such wheel having an inner friction-face, and a counter-shaft suitably supported within such wheel, carrying a series of dogs and coils, the former passing through and serving as cores to the latter, whereby an alternate electric current controlled by commutators and brushes is passed through such coils for the purpose of raising the dogs, in combination with a pressure-plate suspended below for causing the initial movement of the dogs, such dogs adapted to contact successively with the inner face of the power-wheel, thereby revolving the same, substantially as shown and described.

4. In an electric motor, a dog, friction-wheels at its ends, a shaft suitably supported, and coils mounted thereon, the dog passing through the shaft and the coils and operating as a core of the coils when the latter becomes an electro-magnet, in combination with a wheel to be driven mounted on a suitable shaft, its inner surface contacting with the ends of the cores when the latter are actuated by the current, substantially as shown and described.

5. An electric motor composed of an electro-magnet, its core provided with friction-wheels on its ends and adapted to contact with the inner face of a wheel to be driven, in combination with such wheel mounted on a suitable shaft having bearings in the frame-work, substantially as shown and described.

6. An electric motor composed of a coil suitably wound and connected by a commutator and brush to the main circuit, the ends of the core of such magnet insulated, the whole mounted upon a shaft adapted to revolve, so as to bring the end of the core in frictional contact with a wheel to be driven, in combination with such wheel mounted on a shaft suitably supported, substantially as shown and described.

7. An electric motor composed of a series of coils connected by commutators and brushes to the wires of the main circuit, the ends of the cores of such magnets insulated, the whole mounted upon a shaft adapted to revolve, whereby the ends of the core may be successively brought in frictional contact with the wheel to be driven, in combination with such wheel mounted on a shaft having bearings in the frame-work, substantially as shown and described.

In witness whereof I have hereunto set my hand this 6th day of February, 1891.

FRED. L. McGAHAN.

Witnesses:
C. P. JACOBS,
H. D. NEALY.